(12) United States Patent
Shibahara et al.

(10) Patent No.: US 7,431,505 B2
(45) Date of Patent: Oct. 7, 2008

(54) FLUID LUBRICATION BEARING APPARATUS

(75) Inventors: Katsuo Shibahara, Kuwana (JP); Isao Komori, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 356 days.

(21) Appl. No.: 11/326,617

(22) Filed: Jan. 4, 2006

(65) Prior Publication Data
US 2006/0159374 A1 Jul. 20, 2006

(30) Foreign Application Priority Data
Jan. 17, 2005 (JP) ............... 2005-009445

(51) Int. Cl.
*F16C 32/06* (2006.01)
(52) U.S. Cl. ............ 384/100; 29/898.02; 384/120
(58) Field of Classification Search ........... 384/100, 384/107–124; 360/99.08, 98.07; 310/90; 29/898.02
See application file for complete search history.

(56) References Cited

U.S. PATENT DOCUMENTS

| | | | | |
|---|---|---|---|---|
| 6,033,118 A | * | 3/2000 | Asai et al. ............ | 384/115 |
| 6,252,322 B1 | * | 6/2001 | Kawawada et al. ...... | 310/90 |
| 6,851,859 B2 | * | 2/2005 | Takehana et al. ....... | 384/100 |
| 7,005,768 B2 | * | 2/2006 | Tamaoka et al. ....... | 310/90 |
| 2002/0018603 A1 | * | 2/2002 | Narita ................ | 384/100 |

FOREIGN PATENT DOCUMENTS

| | | |
|---|---|---|
| JP | 2003-239951 | 8/2003 |
| JP | 2004-176816 | 6/2004 |

\* cited by examiner

*Primary Examiner*—Thomas R Hannon
(74) *Attorney, Agent, or Firm*—J.C. Patents

(57) ABSTRACT

A resin housing 7 is injection-molded by using a forming mold 11. Moreover, a concave shaped adhesive reservoir 10 is formed by a sink mark of the resin during injection molding on its inner circumferential surface 7e simultaneously with the injection molding of the housing 7. Accordingly, the adhesive can be prevented from overflowing and the adverse influence caused by the overflowing of the excessive adhesive can be avoided. A decrease in the molding precision of the housing can be also prevented and cost reduction by dispensing with a processing step can be enabled.

6 Claims, 5 Drawing Sheets

FLUID LUBRICATION BEARING APPARATUS

BACKGROUND OF THE INVENTION (1) Field of the Invention

The present invention relates to a fluid lubrication bearing apparatus which supports a rotational member by a lubricating film of a fluid occurring in a bearing gap.

(2) Description of the Related Art

In recent years, fluid lubrication bearing apparatuses of this type are used as spindle motors for information appliances, for example, magnetic disk apparatus such as HDD, optical disk apparatuses such as CD-ROM, CD-R/RW, DVD-ROM/RAM, magneto-optic disk apparatuses such as MD and MO, polygon scanner motors of laser beam printer (LBP), and as small motors for other apparatuses, utilizing their excellent rotational accuracy, high rotational speed, silence and other properties.

For example, in a fluid lubrication bearing apparatus integrated in a spindle motor of disk drive units such as HDD, a radial bearing portion which supports a shaft member in the radial direction and a thrust bearing portion which supports the shaft member in the thrust direction are both sometimes constituted of hydrodynamic bearings. An example known of a radial bearing portion in such fluid lubrication bearing apparatuses includes that comprising hydrodynamic pressure grooves formed as a hydrodynamic pressure producing part on one of the inner circumferential surface of the bearing sleeve and the outer circumferential surface of the shaft member opposed to this and a radial bearing gap formed between the two surfaces (for example, refer to Japanese Unexamined Patent Publication No. 2003-239951).

The bearing sleeve constituting the above bearing is fixed at a predetermined position on the inner periphery of a housing. A common means for fixing the bearing sleeve on the inner periphery of the housing is adhesion using an adhesive. The procedure of such a means comprises the steps of, for example, applying an adhesive on the inner circumferential surface of the housing in advance, inserting the bearing sleeve at the inner circumferential surface of the housing, positioning at a predetermined position, and then curing the adhesive.

At this time, if an excessive amount of the adhesive is provided, while the bearing sleeve is being moved to a predetermined position after being inserted at the inner circumferential surface of the housing, an excess of the adhesive may overflow to the front of the bearing sleeve in the direction of movement, which may adversely affect the positioning and the bearing performance of the bearing sleeve. To prevent the adhesive from overflowing, for example, a concave shaped adhesive reservoir is sometimes formed on the inner circumferential surface of the housing (for example, refer to Japanese Unexamined Patent Publication No. 2004-176816).

BRIEF SUMMARY OF THE INVENTION

Meanwhile, the trend of lower cost of information appliances is increasing the demand for reduced costs of fluid lubrication bearing apparatuses. To meet this kind of demand, providing resin structural components which constitute a fluid lubrication bearing apparatus, for example, providing a resin housing is contemplated. In this case, this adhesive reservoir can be formed, for example, by providing a molded surface having the shape corresponding to a concave shaped adhesive reservoir in advance on a forming die for injection-molding the housing on its inner circumferential surface simultaneously with injection molding of the housing. Alternatively, the adhesive reservoir can also be formed by imparting a flat shape to a molded surface corresponding to the inner circumferential surface of the housing, and performing machining such as cutting on the inner circumferential surface of the housing after injection-molding the housing with the forming die having this surface.

In the former method, however, the diameter of the forming die having a molded surface corresponding to the inner circumferential surface of the housing (for example, mold pin) needs to be increased in part, that is, the diameter of the portion corresponding to the adhesive reservoir needs to be increased. Accordingly, removing the mold pin from the inner periphery of the housing after being molded has to be performed forcibly, which may adversely affect the molding precision of the housing. Moreover, in the latter method, cutting inevitably produces cutting powder. The method therefore needs an additional cleaning step, which may result in increased costs.

An object of the present invention is to prevent the overflow of the adhesive, and to avoid the adverse influence caused by the overflowing of an excessive amount of adhesive.

Another object of the present invention is to prevent a decrease in the molding precision of the housing and enable cost reduction by dispensing with a processing step.

To achieve the above objects, a fluid lubrication bearing apparatus according to the present invention is a fluid lubrication bearing apparatus comprising a housing, a bearing sleeve which is adhered at the inner periphery of the housing, a shaft member which is inserted at the inner periphery of the bearing sleeve, a radial bearing portion which supports the shaft member in a non-contact manner in the radial direction by a lubricating film of a fluid which occurs in a radial bearing gap, the housing being formed by injection-molding a resin and having a concave shaped adhesive reservoir on its inner circumferential surface formed by sink marks of the resin during the injection molding.

Normally in injection molding of a resin, a gate to charge a molten resin into the cavity of a forming mold is provided, and the molten resin is injected into the cavity through this gate. After the molten resin in the cavity is cooled and cured, the forming mold is opened to extract the molded article (housing). At this time, due to a difference in the shrinkage rates between the surface portion and inner portion of the mold associated with cooling and curing, shrinkage in molding occurs in a part of the molded article, and an indentation called a sink mark is sometimes formed on the surface of the molded article. The formed position and size of such an indentation (sink mark) vary with, the shape, materials and molding conditions (molding temperature, injection speed, etc.) of the molded article.

The present invention focuses on the sink mark occurring during the above molding on the inner circumferential surface of the housing, and is characterized in that a concave shaped adhesive reservoir is formed by the sink mark during the injection molding. By forming the concave shaped adhesive reservoir on the inner circumferential surface of the housing, the excessive adhesive can be captured in the adhesive reservoir, thereby preventing the adhesive from overflowing to the front of the bearing sleeve in the direction of movement. Not only that, forming this adhesive reservoir by the sink mark of the resin during the injection molding can eliminate the necessity of providing a projection having a shape corresponding to the adhesive reservoir on the outer circumferential surface of the mold pin for molding the housing. Accordingly, adverse influence on the molding precision of the housing by forcefully removing the molded article can be avoided. Moreover, since the adhesive reservoir can be formed simultaneously with the injection molding of the housing, cutting the portion corresponding to the adhesive reservoir on the inner circumferential surface of the housing after molding is unnecessary. In that case, a cleaning step of removing cutting powders can be dispensed with.

Since the adhesive reservoir is formed by the sink mark during the injection molding of the resin, the reservoir has a shape which is smoothly continuous with the adjacent inner circumferential surface of the housing in the axial direction with both its axial ends gradually contracted in diameter in the directions away from each other. Accordingly, in the state that the bearing sleeve is inserted at the inner periphery of the housing, spaces whose axial dimensions gradually decrease in the directions away from each other are formed at both axial ends of the adhesive reservoir. These spaces suction the adhesive positioned in the spaces at both axial ends of the adhesive captured in the adhesive reservoir into the original fixed position (the filled gap of the adhesive between the inner circumferential surface of the housing and the outer circumferential surface of the bearing sleeve) by the capillary force in each space. This allows the exact amount of the adhesive to uniformly fill the adhesion gap, thereby obtaining sufficient fixing force between the two components.

The above adhesive reservoir is preferably provided in such a manner that its deepest part is shifted from the axial position where the radial bearing portion is formed. An adhesive used for adhesive fixing of the bearing sleeve, for example, may expand or shrink in response to a change in the temperature while the bearing is used. In the adhesive reservoir whose adhesive retaining amount is greater then other portions, a change in volume in response to the above temperature change is greater. Accordingly, when the adhesive reservoir is provided to overlap the axial position of the radial bearing portion formed, a region facing the radial bearing gap in the inner circumferential surface of the bearing sleeve is displaced in the radial direction by the influence of a change in volume of the above adhesive, which may adversely affect the radial bearing performance. In the present invention, the above-mentioned event can be avoided by shifting at least the deepest part of the axial position where the adhesive reservoir occurs from the axial position of the radial bearing portion formed.

When the radial bearing portions are formed at a plurality of axially separated positions, the adhesive reservoir is preferably provided at a position corresponding to the region between axially adjacent radial bearing portions.

In the above constitution, the radial bearing portion may be a hydrodynamic bearing which is provided with hydrodynamic pressure grooves in an axially inclined shape such as a herringbone shape or a spiral shape, a hydrodynamic bearing (step bearing) which has a plurality of hydrodynamic pressure grooves each in the shape of an axial groove provided circumferentially at a predetermined interval, or a hydrodynamic bearing (multiple-lobed bearing) whose radial bearing surface is constituted of multilobe surfaces.

The above fluid lubrication bearing apparatus can be provided, for example, as a spindle motor of a disk apparatus comprising a fluid lubrication bearing apparatus.

Thus, according to the present invention, the overflowing of the adhesive can be prevented and the adverse influence caused by overflowing of the excessive adhesive can be avoided by providing the adhesive reservoir on the inner circumferential surface of the housing. Moreover, a decrease in of the housing molding precision can be prevented by forming the adhesive reservoir by the sink mark during injection molding of the resin, and the processing step of the adhesive reservoir can be dispensed with to enable cost reduction.

DETAILED DESCRIPTION OF THE INVENTION

Examples of the present invention will be described below with reference to drawings.

Figure 1:
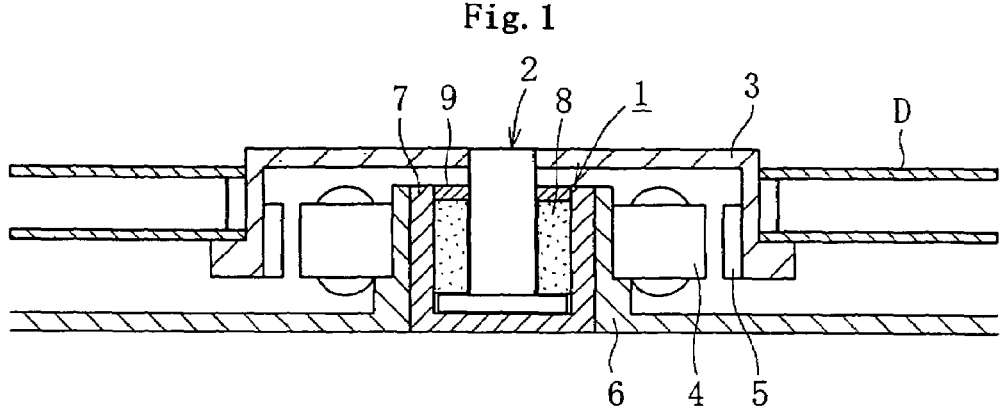
FIG. 1 is a cross-sectional view of a spindle motor for information appliances comprising an integrated fluid lubrication bearing apparatus according to an example of the present invention.

FIG. 1 conceptually shows a constitutional example of a spindle motor for information appliances which comprises an integrated fluid lubrication bearing apparatus 1 according to an example of the present invention. This spindle motor for information appliances is used in disk drive units such as HDD, and comprises the fluid lubrication bearing apparatus 1 which rotatably supports a shaft member 2 in a non-contact manner, a disk hub 3 fixed on the shaft member 2, for example, a stator coil 4 and a rotor magnet 5 which oppose each other across a radial gap, and a bracket 6. The stator coil 4 is mounted on the outer periphery of the bracket 6, and the rotor magnet 5 is mounted on the inner periphery of the disk hub 3. Moreover, the bracket 6 has the fluid lubrication bearing apparatus 1 attached to its inner periphery. The disk hub 3 retains one or more disks D on its outer periphery. In the thus constituted spindle motor for information appliances, when the stator coil 4 is energized, the electromagnetic force between the stator coil 4 and rotor magnet 5 rotates the rotor magnet 5, whereby the disk hub 3 and the disk D retained on the disk hub 3 rotates with the shaft member 2.

Figure 2:
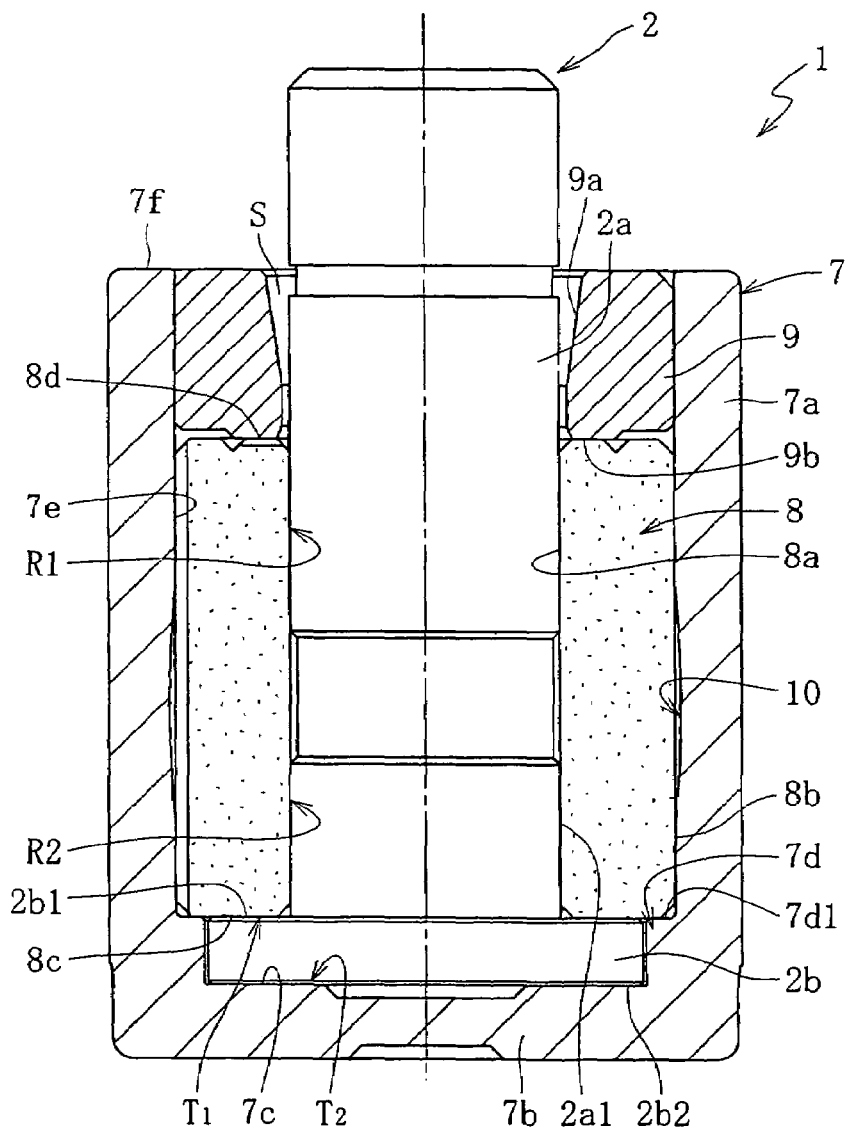
FIG. 2 is a cross-sectional view of a fluid lubrication bearing apparatus.

FIG. 2 shows the fluid lubrication bearing apparatus 1. This fluid lubrication bearing apparatus 1 is constituted of a housing 7 integrally having a cylinder part 7a and a bottom 7b, a beating sleeve 8 fixed on the inner periphery of the housing 7, and the shaft member 2 inserted at the inner periphery of the bearing sleeve 8 as main structural components. It should be noted that for the sake of explanation, the bottom 7b side of the housing 7 is referred to as the lower side, and the side opposite to the bottom 7b is referred to as the upper side in the descriptions below.

The shaft member 2 is formed of, for example, a metallic material such as stainless steel, or has a hybrid structure of a metallic material and a resin material. The shaft member 2 comprises a shaft portion 2a and a flange portion 2b which are integrally or separately provided at the lower end of the shaft portion 2a.

The bearing sleeve 8 is formed of, for example, a soft metallic material such as brass and aluminum (aluminum alloy), or a sintered metal material. In this example, the bearing sleeve 8 is cylindrically formed from a porous body of a sintered metal, in particular a porous body of a sintered metal comprising copper as a main ingredient and is fixed at a predetermined position on the inner circumferential surface 7e of the housing 7 described later.

Figure 3A:
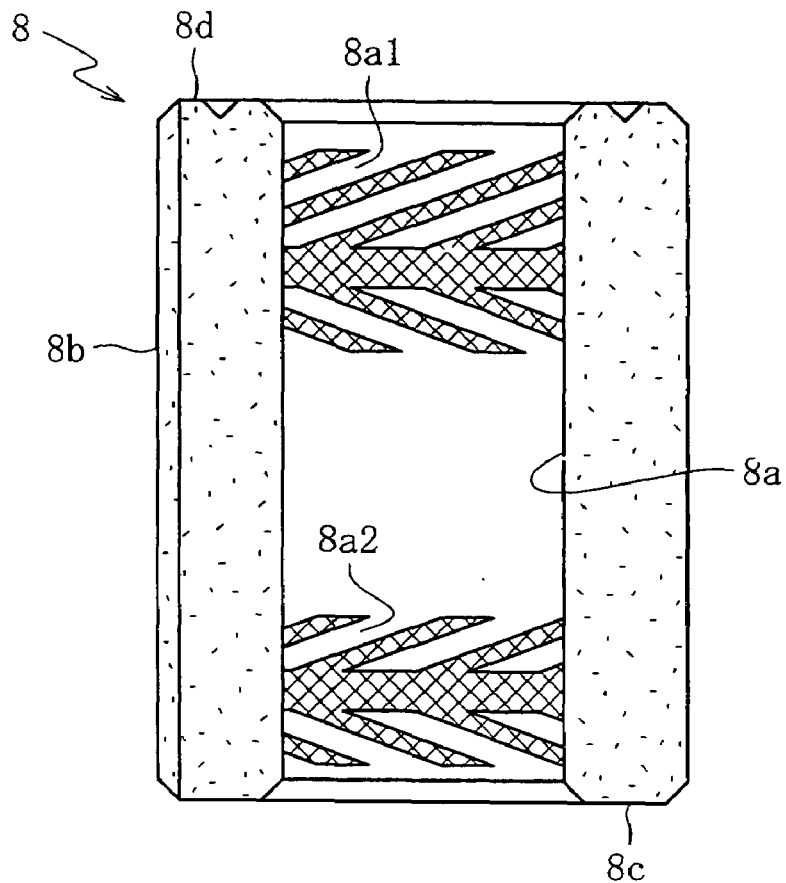
FIG. 3A is a longitudinal sectional view of a bearing sleeve.

Throughout the inner circumferential surface 8a of the bearing sleeve 8 or in its partial cylindrical region, hydrodynamic pressure grooves are formed as a hydrodynamic pressure producing part. For example, as shown in FIG. 3A, regions each comprising a plurality of hydrodynamic pressure grooves 8a1, 8a2 in a herringbone arrangement are formed at two axially separate positions in this example.

Figure 3B:
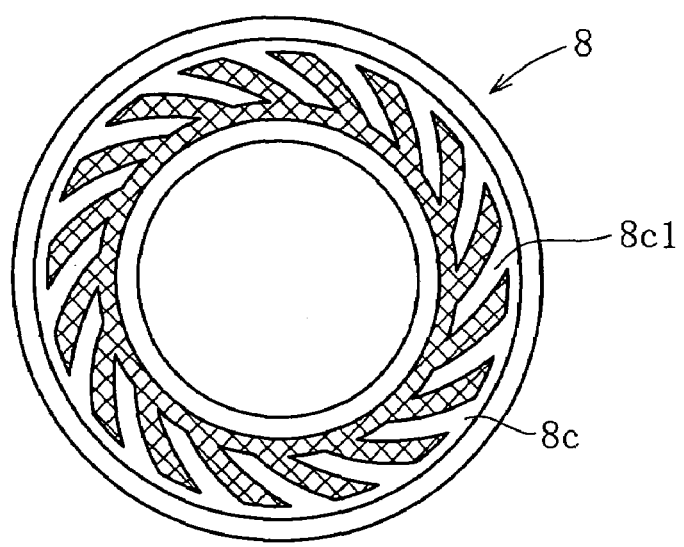
FIG. 3B is a lower end view of the bearing sleeve.

As shown in FIG. 3B, for example, a region comprising a plurality of hydrodynamic pressure grooves 8c1 in a spiral arrangement as a hydrodynamic pressure producing part is formed throughout the lower end face 8c of the bearing sleeve 8 or in an annular region thereof.

The housing 7 is injection-molded using a resin composition based on a crystalline resin such as LCP, PPS and PEEK, and is constituted of, for example, the cylinder part 7a and the bottom 7b integrally formed at the lower end of the cylinder part 7a, as shown in FIG. 2. The above resin composition constituting the housing 7 can additionally comprises, for example, a fibrous filler such as glass fiber, a whisker-like filler such as potassium titanate, a scale-like filler such as mica, carbon fiber, carbon black, graphite, carbon nanomaterial, a fibrous or powdery conductive filler such as various kinds of metal powders, in a suitable amount depending on the purpose.

Although not shown in the Figs., for example, a region comprising a plurality of hydrodynamic pressure grooves arranged spirally is formed as a thrust hydrodynamic pressure producing part in an annular region of the upper end face 7c of the bottom 7b. An engaging portion 7d which engages the lower end face 8c of the bearing sleeve 8 for positioning in the axial direction is formed above the upper end face 7c. An abutment face 7d1 abutting on the lower end face 8c of the bearing sleeve 8 is formed at the upper end of the engaging portion 7d via the upper end face 7c of the bottom 7b and a predetermined axial step.

In the region of the inner circumferential surface 7e of the housing 7 opposed to the outer circumferential surface 8b of the bearing sleeve 8, a concave shaped adhesive reservoir 10 is formed. In this example, the adhesive reservoir 10 is formed at a position corresponding to the region between these radial bearing portions R1, R2 so that the deepest part of the adhesive reservoir 10 does not overlap the axial position where the radial bearing portions R1, R2 described later are formed, as shown in FIG. 2.

Figure 4:
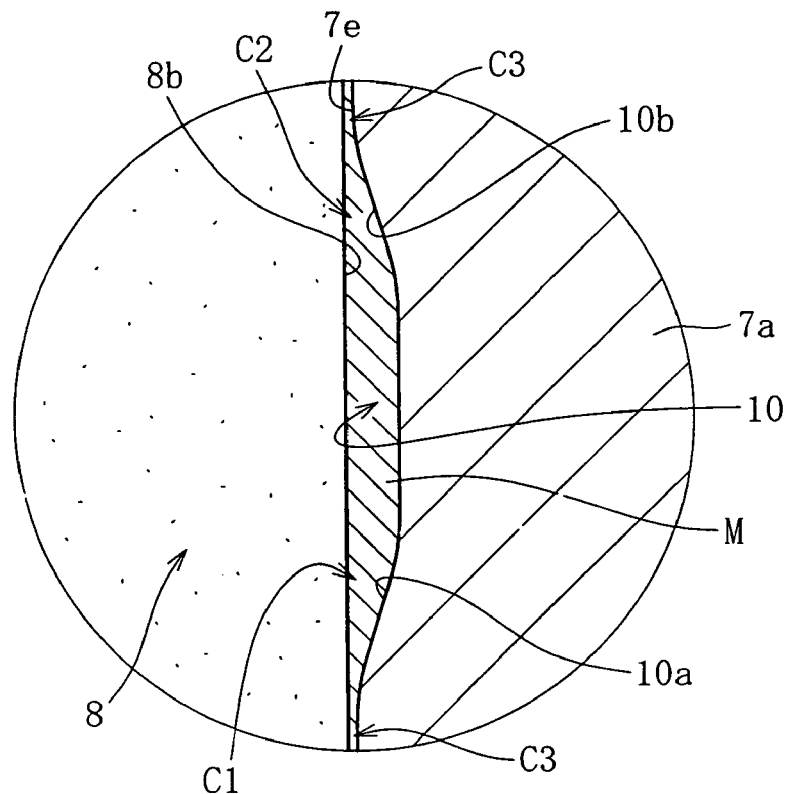
FIG. 4 is an expanded sectional view showing the vicinity of an adhesive reservoir on a housing.
Figure 5:
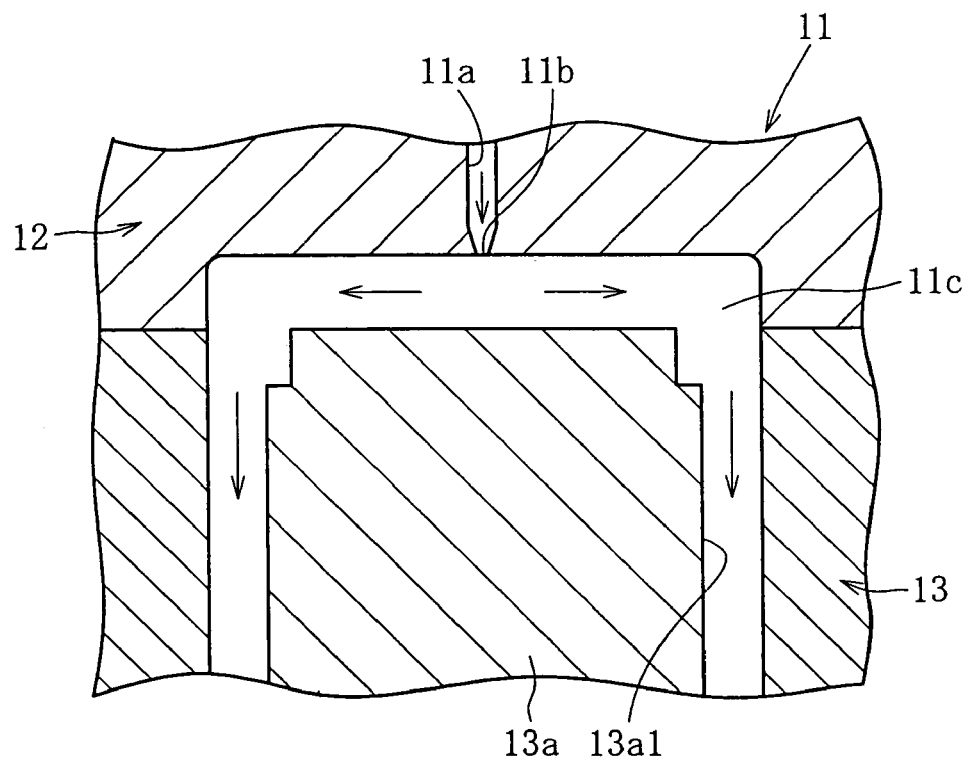
FIG. 5 is a cross-sectional view which conceptually shows the molding step of a housing.

The housing 7 having the above adhesive reservoir 10 is formed, for example, by using a forming mold 11 shown in FIG. 4. This forming mold 11 is constituted of a stationary mold 12 and a movable mold 13, and comprises a runner 11a, a point-like gate 11b, and a cavity 11c. Among these, the movable mold 13 has a molded surface 13a1 which forms the inner circumferential surface 7e of the housing 7 on the outer periphery of a pin 13a positioned on the inner periphery side of the housing 7. In this example, at least the region corresponding to the adhesive reservoir 10 on the inner circumferential surface 7e of the housing 7 in the molded surface 13a1 is in an axially straight shape. It should be noted that the point-like gate 11b is formed in the cavity 11c at a position corresponding to the axis of the lower end face of the bottom 7b of the housing, and its gate area is designed to have a appropriate dimension considering the viscosity and injection speed of the molten resin when in a molten state.

A molten resin ejected from a nozzle of an injection molding machine (not shown) is charged into the cavity 11c through the runner 11a of the forming mold 11 and the point-like gate 11b. Hence, charging the molten resin into the cavity 11c from the point-like gate 11b (in the direction of the arrow in FIG. 4) allows the molten resin to uniformly fill in the radial direction (mainly the region corresponding to the bottom 7b) and in the axial direction (mainly the region corresponding to the cylinder part 7a) of the cavity 11c. After the molten resin charged into the cavity 11c is cured, the forming mold 11 is opened to extract the formed housing 7. This can prevent the occurrence of weld, thereby obtaining the housing 7 with high dimensional accuracy.

In the above injection molding, a sink mark occurs in the region corresponding to the inner circumferential surface 7e of the housing 7. This sink mark communicates with the inner circumferential surface 7e of the housing 7 adjacent to both ends of the adhesive reservoir 10, that is, in the state that the concave shaped adhesive reservoir 10 shown in FIG. 4 is formed and both its axial ends 10a, 10b are gradually contracted in diameter in the directions away from each other. Thus, since the adhesive reservoir 10 is formed during the injection molding of the housing 7 by the sink mark occurring at the position corresponding to its inner circumferential surface 7e, the portion corresponding to the adhesive reservoir 10 in the molded surface 13a1 of the pin 13a corresponding to the inner circumferential surface 7e of the housing 7 needs not be a projection. Accordingly, the mold needs not be forcefully opened to extract the pin 13a after the molding, preventing adverse influence on the molding precision of the housing 7. Moreover, since the adhesive reservoir 10 can be formed simultaneously with the molding of the housing 7, additional machining on the inner circumferential surface 7e of the housing 7 after the molding is unnecessary, resulting in simplified operation steps.

The fixing operation of the bearing sleeve 8 to the housing 7 produced in the above procedure is carried out, for example, in the procedure described below.

Firstly, a predetermined amount of an adhesive is applied on the inner circumferential surface 7e of the housing 7. Secondly, the bearing sleeve 8 into which the shaft member 2 is inserted at its inner periphery is fitted to an opening portion 7f of the housing 7, and the bearing sleeve 8 is pushed downward to a position where the lower end face 8c of the bearing sleeve 8 abuts on the abutment face 7d1 of the engaging portion 7d. At this time, for example, as shown in FIG. 4, spaces C1, C2, the diameters of whose radial dimensions gradually decrease, are formed between both axial ends 10a, 10b of the adhesive reservoir 10 and the outer circumferential surface Bb of the bearing sleeve 8 opposed to both these ends 10a, 10b, respectively. The adhesive reservoir 10 communicates with a filled gap C3 of the adhesive between the bearing sleeve 8 and housing 7 via these spaces C1, C2.

In the insertion of the bearing sleeve 8, if the amount of an adhesive M applied on the inner circumferential surface 7e is excessive, the excessive adhesive M pushed out from the filled gap C3 of the adhesive M flows toward the adhesive reservoir 10, and retained in the adhesive reservoir 10. This prevents the adhesive M from overflowing forwardly in the pushing direction of the bearing sleeve 8, preventing the adhesive M from entering between the lower end face Bc and the abutment face 7d1 abutting on this face. As a result, the axial position of the bearing sleeve 8 relative to the housing 7 can be determined precisely. Moreover, as in this example, even when the hydrodynamic pressure grooves 8$c$1 are formed on the lower end face 8$c$ of the bearing sleeve 8, the adhesive M can be prevented from covering up the hydrodynamic pressure grooves 8$c$1 by retaining the excessive adhesive M in the adhesive reservoir 10, and the supporting force in the thrust direction can be thus obtained stably.

When the charging of the adhesive M in the filled gap C3 is insufficient, the adhesive M in the spaces C1, C2 positioned at both ends of the adhesive reservoir 10 are suctioned into the original fixed positions the filled gap C3 of the adhesive M, respectively, by the capillary force in the directions away from each other. This allows the filled gap C3 to be uniformly filled with the adhesive M throughout its periphery, and a required fixing force between the housing 7 and bearing sleeve 8 can be thus obtained.

After the bearing sleeve 8 is thus positioned and fixed, a sealing portion 9 is fixed on the inner periphery of the opening portion 7$f$ of the housing 7 by adhesion or like means with its lower end face 9$b$ abutting on the upper end face 8$d$ of the bearing sleeve 8. Finally, a lubricating oil is charged into the inner space of the housing 7, completing the fluid lubrication bearing apparatus 1. At this time, the oil level of the lubricating oil filling the inner space sealed by the sealing portion 9 of the housing 7 is maintained in a sealing space S formed between a tapered face 9$a$ provided on the inner periphery of the sealing portion 9 and the outer circumferential surface 2$a$1 of the shaft portion 2$a$ opposed to the tapered face 9$a$.

In the thus-constituted fluid lubrication bearing apparatus 1, when the shaft member 2 is rotated, a pressure is produced by the hydrodynamic effect of the lubricating oil in the radial bearing gap between the regions where the hydrodynamic pressure grooves 8$a$1, 8$a$2 on the inner circumferential surface 8$a$, which serves as a radial bearing surface, of the bearing sleeve 8 are formed (upper and lower positions) and the outer circumferential surface 2$a$1 of the shaft portion 2$a$ opposed to the regions where these hydrodynamic pressure grooves 8$a$1, 8$a$2 are formed, respectively, and the shaft portion 2$a$ of the shaft member 2 is rotatably supported in a non-contact manner in the radial direction. Accordingly, a first radial bearing portion R1 and a second radial bearing portion R2 which rotatably support the shaft member 2 in the radial direction in a non-contact manner are formed. Moreover, pressures are produced in a thrust bearing gap between the region where the hydrodynamic pressure grooves 8$c$1 is formed on the lower end face 8$c$, which serves as a thrust bearing surface, of the bearing sleeve 8 and the upper end face 2$b$1 of the flange portion 2$b$ opposed to the region where this hydrodynamic pressure groove 8$c$1 is formed, and, in a thrust bearing gap between the region where the hydrodynamic pressure grooves are formed on the upper end face 7$c$, which also serves as a thrust bearing surface, of the bottom 7$b$ (not shown) and the lower end face 2$b$2 of the flange portion 2$b$ opposed to the region where these hydrodynamic pressure grooves are formed, and the flange portion 2$b$ of the shaft member 2 is rotatably supported in both thrust directions in a non-contact manner by the hydrodynamic effect of the lubricating oil. Accordingly, a first thrust bearing portion T1 and a second thrust bearing portion T2 which rotatably support the shaft member 2 in the thrust direction in a non-contact manner are formed.

As shown in FIG. 2, the adhesive reservoir 10 is formed at an axial position corresponding to the region between the radial bearing portions R1, R2 so that the deepest part of the adhesive reservoir 10 does not overlap the axial positions where the radial bearing portions R1, R2 are formed in this example. Accordingly, even if the adhesive M in the adhesive reservoir 10 expands or shrinks in response to a change in the temperature while the bearing is used, this change in volume hardly affects the inner circumferential surface 8$a$ of the bearing sleeve 8, in particular a region facing the radial bearing gap (region where the hydrodynamic pressure grooves 8$a$1, 8$a$2 are formed) thereof. As a result, a variation in a radial bearing gap formed between the outer circumferential surface 2$a$1 of the shaft portion 2$a$ and the inner circumferential surface 8$a$ of the bearing sleeve 8 can be prevented to stably support the shaft member 2 in the radial direction.

Although an example of the present invention is described above, the present invention is not limited to this example.

In the above examples, the housing 7 is described to comprise the cylinder part 7$a$ and bottom 7$b$ which are integrally formed of a resin. However, the cylinder part 7$a$ can be, for example, formed of a resin separately from the bottom 7$b$, although not shown in the Figs. In this case, for example, the sealing portion 9 can be formed of a resin integrally with the cylinder part 7$a$. This allows the positioning of the bearing sleeve 8 in the axial direction to be carried out by abutting the upper end face 8$d$ of the bearing sleeve 8 on the lower end face 9$b$ of the sealing portion 9.

In the above examples, such a constitution that the hydrodynamic effect of the lubricating fluid is produced by the hydrodynamic pressure grooves arranged in a herringbone shape or a spiral shape is shown as an example of the radial bearing portions R1, R2 and thrust bearing portions T1, T2, but the present invention is not limited to this constitution.

For example, so-called step bearings and multiple-lobed bearings can be employed as the radial bearing portions R1, R2.

Figure 6:
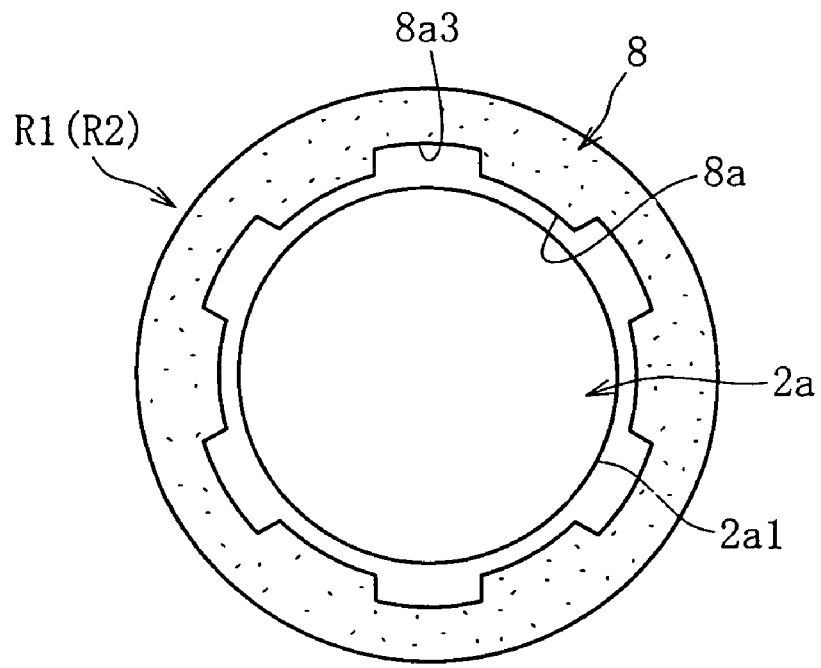
FIG. 6 is a cross-sectional view showing another constitutional example of a radial bearing portion.

FIG. 6 shows an example where one or both of the radial bearing portions R1, R2 are constituted of step bearings. In this example, a plurality of hydrodynamic pressure grooves in the shape of an axial groove 8$a$3 are provided at a predetermined circumferentially interval in the region (region which serves as a radial bearing surfaces) facing the radial bearing gap of the inner circumferential surface 8$a$ of the bearing sleeve 8.

Figure 7:
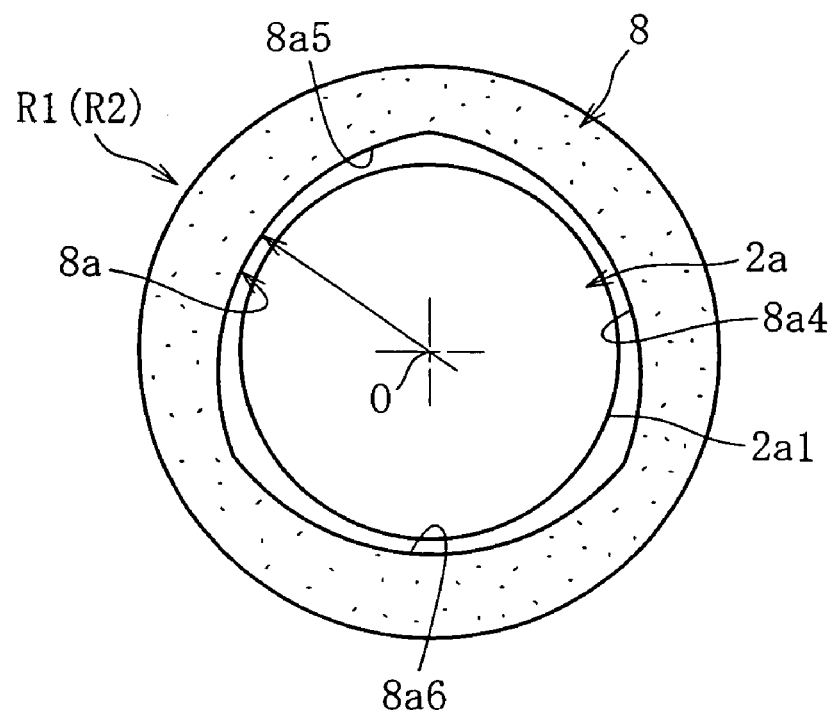
FIG. 7 is a cross-sectional view showing another constitutional example of a radial bearing portion.

FIG. 7 shows an example in which one or both of the radial bearing portions R1, R2 are constituted of multiple-lobed bearings. In this example, the region which serves as a radial bearing surface of the inner circumferential surface Ba of the bearing sleeve 8 is constituted of three arcuate faces 8$a$4, 8$a$5, 8$a$6 (so-called three-arc bearing). The centers of curvature of the three arcuate faces 8$a$4, 8$a$5, 8$a$6 are offset by the same distance from the axial center O of the bearing sleeve 8 (shaft portion 2$a$). In the regions demarcated by the three arcuate faces 8$a$4, 8$a$5, 8$a$6, the radial bearing gaps have a shape whose dimensions gradually decrease in a wedge shape relative to both circumferential directions Accordingly, when the bearing sleeve 8 and the shaft portion 2$a$ relatively rotate, the lubricating fluid in the radial bearing gap is pushed to the smallest gap side whose size decreases in a wedge shape and its pressure increased depending on the direction of its relative rotation. The bearing sleeve 8 and shaft portion 2$a$ are supported in a non-contact manner by such a hydrodynamic effect of the lubricating fluid. It should be noted that axial grooves located at a deeper level called separation grooves may be formed at the boundary portions between the three arcuate faces 8$a$4, 8$a$5, 8$a$6.

Figure 8:
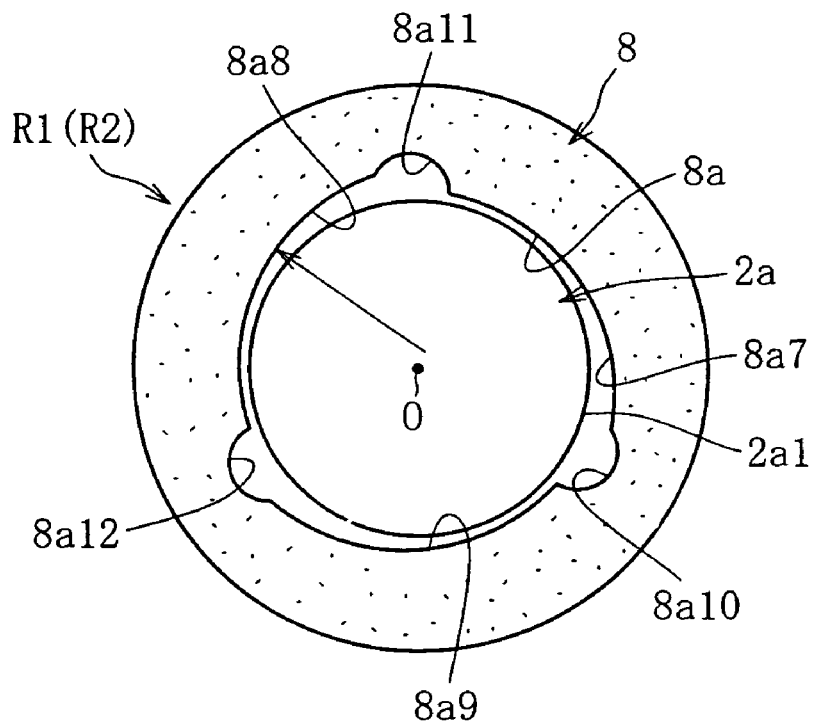
FIG. 8 is a cross-sectional view showing another constitutional example of a radial bearing portion.

FIG. 8 shows another example in which one of both of the radial bearing portions R1, R2 are constituted of multiple-lobed bearings. Also in this example, a region which serves as a radial bearing surface on the inner circumferential surface 8$a$ of the bearing sleeve 8 is constituted of three arcuate faces 8a7, 8a8, 8a9 (so-called three-arc bearing). In the regions demarcated by the three arcuate faces 8a7, 8a8, 8a9, the radial bearing gaps have a shape whose dimensions gradually decrease in a wedge shape relative to one of the circumferential directions. The thus constituted multiple-lobed bearing is sometimes referred to as a taper bearing. Moreover, axial grooves 8a10, 8a11, 8a12 located at a deeper level called separation grooves are formed at the boundary portions between each of the three arcuate faces 8a7, 8a8, 8a9. Accordingly, when the bearing sleeve 8 and shaft portion 2a relatively rotate in a predetermined direction, the lubricating fluid in the radial bearing gap is pushed to the smallest gap side whose dimension decreases in a wedge shape and its pressure increases. The bearing sleeve 8 and shaft portion 2a are supported in a non-contact manner by such a hydrodynamic effect of the lubricating fluid.

Figure 9:
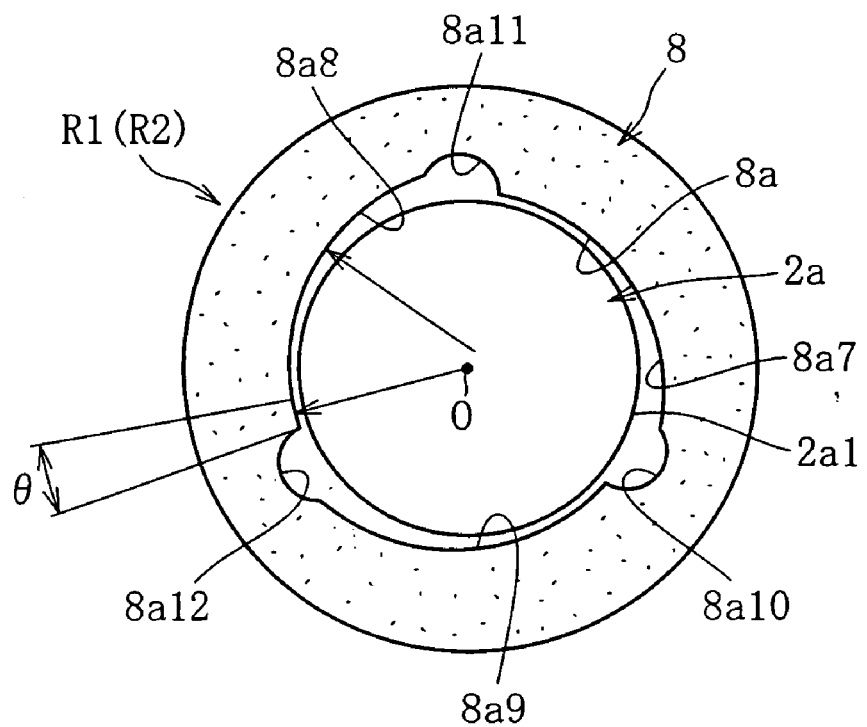
FIG. 9 is a cross-sectional view showing another constitutional example of a radial bearing portion.

FIG. 9 shows another example in which one or both of the radial bearing portions R1, R2 are constituted of multiple-lobed bearings. In this example, in the constitution shown in FIG. 8, a predetermined region θ on the smallest gap side of the three arcuate faces 8a7, 8a8, 8a9 are constituted of the arcs which are concentric relative to the axial center O of the bearing sleeve 8 (shaft portion 2a) as the center of curvature and have the same diameter. Therefore, in the predetermined regions θ, the radial bearing gap (minimum gap) becomes constant. The thus constituted multiple-lobed bearing is sometimes referred to as a taper flat bearing.

The multiple-lobed bearing in the above examples is a so-called three-arc bearing, but it is not limited to this and a so-called four-arc bearing, five-arc bearing, or multiple-lobed bearings constituted of six or more arcuate faces may be employed. Moreover, when the radial bearing portion is constituted of a step bearing or multiple-lobed bearing, it may have such a constitution that two radial bearing portions are provided separately in the axial direction like the radial bearing portions R1, R2, or that a single radial bearing portion is provided throughout the upper and lower regions of the inner circumferential surface 8a of the bearing sleeve 8.

One or both of the thrust bearing portions T1, T2 may be constituted of, for example, a so-called step bearing, a so-called wave-form bearing (step bearing shaped into a wave form) or a like bearing comprising hydrodynamic pressure grooves in the shape of a plurality of radial grooves provided in a region which serves as a thrust bearing surface circumferentially at a predetermined interval.

The radial bearing portions R1, R2 and thrust bearing portions T1, T2 may be constituted of other bearings than hydrodynamic bearings. For example, a pivot bearing and a circular bearing may be used as a thrust bearing portion and a radial bearing portion, respectively.

In the above examples, a lubricating oil is mentioned as an example of as a fluid for filling inside of the fluid lubrication bearing apparatus 1, the radial bearing gap between the bearing sleeve 8 and shaft member 2 and for forming a lubricating film in the thrust bearing gap between the bearing sleeve 8 or housing 7 and the shaft member 2. However, other fluids which can form a lubricating film in the bearing gaps, for example, gases such as air, lubricating agents with fluidity and such as magnetic fluids, lubricating greases and the like may be used.

The invention claimed is:

1. A fluid lubrication bearing apparatus comprising a housing; a bearing sleeve which is adhered on the inner periphery of the housing; a shaft member which is inserted at the inner periphery of the bearing sleeve and rotates relative to the housing and the bearing sleeve; and a radial bearing portion which supports the shaft member in a non-contact manner in the radial direction by a lubricating film of a fluid which occurs in a radial bearing gap, the housing being formed by injection-molding a resin and having a concave shaped adhesive reservoir on its inner circumferential surface formed by a sink mark of the resin during the injection molding, and the adhesive reservoir being provided with at least its deepest part shifted from the axial position where the radial bearing portion is formed.

2. A fluid lubrication bearing apparatus according to claim 1, wherein the radial bearing portion is provided at a plurality of axially separated positions and the adhesive reservoir is provided at a position corresponding to a region between the axially adjacent radial bearing portions.

3. A spindle motor of a disk apparatus comprising a fluid lubrication bearing apparatus according to claim 2.

4. A fluid lubrication bearing apparatus according to claim 2, wherein the radial bearing portion is provided at two axially separated positions and the adhesive reservoir is provided at a position corresponding to a region between the axially adjacent radial bearing portions.

5. A spindle motor of a disk apparatus comprising a fluid lubrication bearing apparatus according to claim 1.

6. A manufacturing method of a fluid lubrication bearing apparatus comprising a housing; a bearing sleeve which is adhered on the inner periphery of the housing; a shaft member which is inserted at the inner periphery of the bearing sleeve and rotates relative to the housing and the bearing sleeve; and a radial bearing portion which supports the shaft member in a non-contact manner in the radial direction by a lubricating film of a fluid which occurs in a radial bearing gap, the method having a first step of forming the housing by injection molding of a resin, a second step of applying an adhesive on the inner circumferential surface of the housing, and a third step of fixing the bearing sleeve on the inner circumferential surface of the housing by adhesion after inserting the bearing sleeve to the inner periphery of the housing on which the adhesive is applied, a concave shaped adhesive reservoir being formed on its inner circumferential surface by a sink mark of the resin during the injection molding.

* * * * *